March 26, 1963 O. E. JACKSON 3,082,665
SPRING CLIP FOR RETAINING REAR VIEW MIRROR AND THE LIKE
Filed Nov. 27, 1961
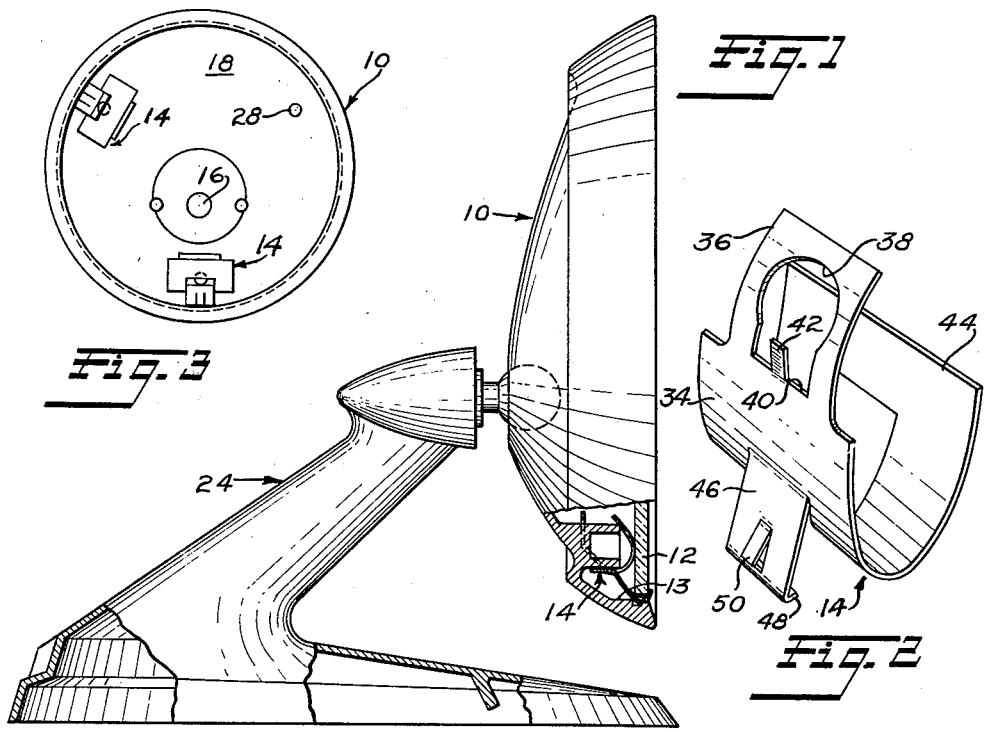
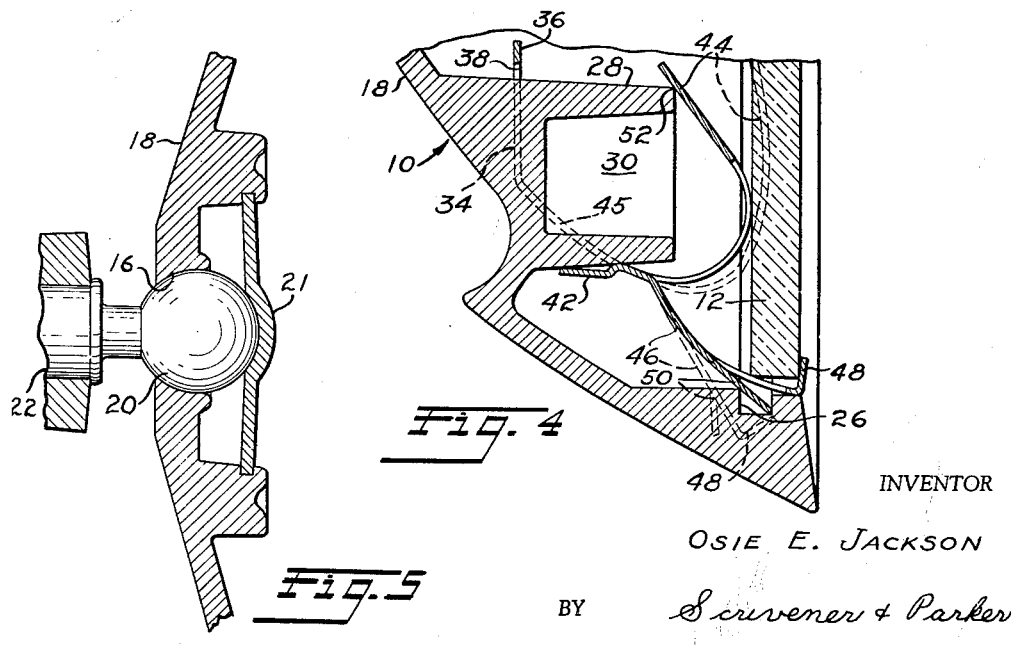
INVENTOR
OSIE E. JACKSON
BY Scrivener & Parker
ATTORNEYS United States Patent Office 3,082,665
Patented Mar. 26, 1963

3,082,665
SPRING CLIP FOR RETAINING REAR VIEW
MIRROR AND THE LIKE
Osie E. Jackson, Detroit, Mich., assignor to Associated Spring Corporation, Bristol, Conn., a corporation of Delaware
Filed Nov. 27, 1961, Ser. No. 155,056
6 Claims. (Cl. 88—96)

This invention relates to improved means for retaining a relatively flat member within the confines of a matching opening and, more particularly, to an improved spring clip which is especially though not exclusively adapted for the retention of a rear-view mirror within the opening of the mirror casing.

A rear-view mirror structure of the type to which the invention relates may comprise a relatively shallow, somewhat conical hollow casing which is open on one side to receive a mirror and is provided with a socket on the obverse side to receive a ball joint connected to a suitable standard which is adapted to be attached to a vehicle body. In one particular type of structure, for which the present invention is especially adapted, the mirror, after being inserted into the opening is retained against movement out of the opening by a snap-ring which is received in an annular groove in the open side of the mirror. To hold the mirror firmly in position so as to prevent rattling or relative movement of the mirror with respect to the casing, a plurality of coil springs are included in the casing and are there received in axially extending hollow bosses, the arrangement being such that the springs bear against a diaphragm member abutting the rear of the mirror to press the latter into tight engagement with the snap-ring.

One object of the present invention is to provide mirror retaining means adapted for use with the type of mirror casing described above, so that the latter requires no modification whatsoever.

It is another and broad object of the present invention to provide improved unitary spring clip means which are adapted to retain a relatively flat article within the confines of a matching opening, the clip being so constructed as to prevent the ready withdrawal of the article from the opening, while at the same time it exerts spring pressure against the rear of the article in the direction of the opening so that the article is retained snugly in its position of intended use.

More particularly, it is an object of the invention to provide spring clip means for retaining a rear-view mirror in the opening of its casing, while eliminating the use of a variety of disparate items, such as snap-rings, coil-springs and the like which have heretofore been required.

Still another object of the invention is to provide a unitary spring clip for the retention of a rear-view mirror in the opening of a casing, which clip is itself not only relatively inexpensive to manufacture but also permits the assembly of a mirror in its casing with greater ease and in considerably less time than has been possible with the mirror assembly means used heretofore.

Other objects and their attendant advantages will become apparent as the following detailed description is read in conjunction with the accompanying drawings, wherein: FIG. 1 is a vertical side elevation, partly broken away, of a rear-view mirror assembly incorporating the clip provided by the present invention;

FIG. 2 is an enlarged perspective view of the clip of the present invention;

FIG. 3 is a reduced plan view showing the interior of a mirror casing with two of the clips of the present invention in their position of use;

FIG. 4 is an enlarged, vertical, broken cross-sectional view of a mirror and casing assembly showing the assembly of casing, mirror and retaining clip; and FIG. 5 is an enlarged vertical cross-sectional view showing one means for connecting the mirror casing to its standard.

Referring now to the drawings, and particularly to FIG. 1, the numeral 10 designates the casing for a rear-view mirror 12 which is connected within the opening 13 of the casing by clip means generally indicated by the numeral 14 and hereinafter described in detail.

The particular casing 10 shown is of known construction and comprises a hollow somewhat shallow conical structure having a spherical socket 16 in the rear wall 18 thereof for the reception of a ball joint 20 which is retained in place by a conventional bridge member 21. The ball joint has a stem 22 which is received in the upper end of a suitable standard 24, which is adapted to be attached to the exterior of a vehicle by any conventional means known to the art.

The mirror casing 10 shown is of known construction and is of the type having just in the opening 13 an annular recess 26 normally adapted to receive a snap-ring for retention of the mirror within the confines of the opening.

In addition, the interior of the casing wall 18 is provided with a plurality of circumferentially-spaced supporting members or bosses 28 whose outer ends are spaced inwardly of the opening 13. Each boss has therein a recess 30 which, in the case of the present invention, affords no useful purpose but inasmuch as the casing shown is of known construction, the recesses are illustrated because in the original assembly, of which the present invention is a substantial improvement, the recesses served to seat coil springs which bear on a diaphragm in abutment with the rear of the mirror to force the latter into tight engagement with the snap-ring.

As previously mentioned, the present invention substitutes three identical unitary spring clips for the snapping, coil springs and diaphragm of the prior assembly. With particular reference to FIGS. 2 and 4, each spring clip 14 comprises a body of substantially U-shaped springy sheet material having one leg 34 whose outer end part 36 may have a reduced lateral dimension so as to form a tongue, the center part of which is punched to provide a circular opening 38 having a diameter slightly greater than the diameter of the boss 28. The inner end of the opening 38 intersects a square notch 40 which has extending centrally from the lower edge thereof an upstanding tang 42 which is adapted to engage and be bent outwardly by the radial outer side of each boss 28 when the boss is received in the opening 38, as clearly illustrated in FIG. 4.

The other leg 44 of the U-shaped body is normally at a large acute angle to the first leg 34, and when the clip is assembled to the mirror and its casing, as illustrated by the dotted lines in FIG. 4, the mirror back engages the leg 44 and forces it toward leg 34 and into the position shown in full lines so that the leg is bent rearward to exert an outward resilient force on the mirror as will become more fully understood hereinafter.

The leg 44 is connected to leg 34 by a bottom part 45 which extends from the inner end of leg 34 to the inner end of leg 44. This 45, just adjacent its juncture with leg 44, is centrally punched to provide a struck-out tongue 46 which normally extends outwardly away from the convex side of part 45 of the clip and is flat, as indicated by the dotted lines in FIG. 4. The outer or free end of tongue 46 is bent inwardly to form a flange 48 and just rearwardly of the flange, the tongue is punched to provide a tang 50 which extends forwardly and outwardly from the lower side of the tongue.

In use, when a mirror is to be assembled with its casing, the spring clip of the invention is first placed loosely on each of the bosses so that tongue 46 and tang 50 of the clip extend freely outside of the casing but desirably in engagement with the outer edge of the opening 13. The mirror 12 is then aligned with the opening 13 with the inner edge of the mirror engaging the tongue 46. Thereafter, the assembler merely pushes inwardly on the mirror and as he does so the tongue 46 is cammed radially inwardly on the inner annular edge of the opening 13 so that the flange 46 is moved inwardly so as to be in front of the outer peripheral edge of the mirror as clearly illustrated in FIG. 4. As the assembler continues to push inwardly on the mirror, the tang 50 slides to a position in which it can snap into the annular groove 26 whereupon further inward movement of the mirror is resisted and at this point the front leg 44 of the clip is pushed inwardly of the casing by the mirror, as shown in FIG. 4, so that this leg exerts an outward force on the mirror to press the latter into snug engagement with the flange 48 of the clip. The entire assembly is thereafter prevented from undesired or accidental removal from the opening by means of the one-way connection afforded by engagement of the tang 50 with the annular groove 26.

To insure that the mirror cannot readily be pushed too far inwardly during assembly, as the mirror moves towards the position of FIG. 4, it tends to rotate the clip 50 bodily clock-wise about the fulcrum provided by the bottom edge of the rectangular opening 40. However, such rotation is resisted by the tang 42 and as the clip is progressively compressed by the inward movement of the mirror the tang 42 is moved into increasingly greater frictional engagement with the outer wall of the boss 28 so that further inward movement of the mirror beyond its desired position is effectively prevented. In addition to the foregoing, the inner side of the upper end of the leg 44 may move into abutment with the inner radial edge of the boss, as shown at 52 in FIG. 4, to further insure proper positioning of the mirror.

As shown in FIG. 3, the casing is provided with three bosses and hence three spring clips are required for the normal and usual mounting of a mirror, although it will be obvious that more or fewer clips may be utilized as desired. Additionally, in place of the annular groove 26 for the reception of the tangs 50, a series of notches located radially outwardly of the bosses but in substantial alignment therewith would serve equally well.

The present invention is by no means limited to use with rear-view mirrors but, where so used, a variety of disparate items such as coil springs, diaphragms and snap-rings, are eliminated and the mirror may be assembled in its casing in a fraction of the time required for assembling mirrors previously.

It will be apparent to those skilled in the art that the invention is susceptible of a variety of modifications and uses without, however, departing from the scope and spirit of the appended claims. Where in the claims the term "closure member" is used, this term is intended to include a mirror or any other similar device such as a lid, cover or the like which is to be assembled into a matching opening.

What is claimed is:

1. A spring clip comprising a U-shaped body member of springy sheet material having front and rear legs and a downwardly and forwardly sloping bottom part joining the corresponding ends of the respective legs, said rear leg having a hole therein adapted to slidably receive a relatively stationary supporting member, a downwardly and forwardly extending tongue having its rear end integral with said bottom part rearwardly of said front leg, an upturned flange extending in the direction of said front leg on the free end of said tongue, and a tang having its rear end integral with said tongue and extending downwardly and forwardly with respect to said tongue in the direction of the free end thereof, said tongue and said tang both being of springy material so as to be adapted to yield in the direction of said front leg upon engagement with a raised intervening surface as said rear leg is slid over a supporting member.

2. The spring clip of claim 1 including a tang having an end intergally fixed to said rear leg below said hole and being adapted to engage said supporting member to resist rotation of said clip in the direction of said tang as said rear leg is slid over said supporting member.

3. For use with a casing member having an opening in one side adapted to receive a closure member, a support on the interior of the casing extending in the direction of said opening and having a free outer end from said opening, spaced, and a laterally extending groove on the interior of said casing spaced radially outwardly of but substantially in alignment with said support, a spring clip adapted to retain said closure member in said opening comprising a substantially U-shaped member of springy material having inner and outer legs, and a bottom part joining the corresponding ends of said legs, said inner leg having a hole therethrough adapted to slidingly receive said support, a downwardly and forwardly sloping tongue having one end integrally connected to said bottom part rearwardly of said front leg, an upturned flange on the free end of said tongue, and a tang having its rear end integral with said tongue and extending downwardly and forwardly with respect to said tongue in the direction of the free end thereof, said tongue and said tang both being of springy material with their outer ends normally extended radially beyond the marginal edge of said opening of said casing when said hole in said rear leg is engaged on the outer end of said boss, said tongue and said tang being adapted to be cammed radially inwardly as said rear leg is slid onto said support so as to move said flange in front of the peripheral edge of said closure member and to effect engagement of said tang in said slot to prevent the withdrawal of said closure member from said opening.

4. The spring clip of claim 3 wherein the free end of said tongue in its unsprung condition is normally spaced rearwardly of the plane of said front leg so that said leg is adapted to resiliently abut the rear of said closure member as said flange is cammed in front of the peripheral edge of said member.

5. The spring clip of claim 3 including a second tang having one end integral with said rear leg and extending in a direction to engage said support to resist rotation of said clip as said rear leg is slid on to said support.

6. The spring clip of claim 3 wherein said bottom part slopes downwardly and forwardly from said rear to said front leg.

No references cited.